United States Patent
Ferraro et al.

(10) Patent No.: US 9,735,434 B2
(45) Date of Patent: Aug. 15, 2017

(54) CERAMIC ENCLOSED THERMAL BATTERY

(71) Applicant: EAGLEPICHER TECHNOLOGIES, LLC, Joplin, MO (US)

(72) Inventors: James Ferraro, Baxter Springs, KS (US); Greg Kirk, Oronogo, MO (US); Greg Miller, Diamond, MO (US); Charles Lamb, Carthage, MO (US)

(73) Assignee: EaglePicher Technologies, LLC, Joplin, MO (US)

(*) Notice: Subject to any disclaimer, the term of this patent is extended or adjusted under 35 U.S.C. 154(b) by 265 days.

(21) Appl. No.: 13/738,511

(22) Filed: Jan. 10, 2013

(65) Prior Publication Data
US 2013/0323562 A1 Dec. 5, 2013

Related U.S. Application Data

(60) Provisional application No. 61/655,150, filed on Jun. 4, 2012.

(51) Int. Cl.
*H01M 6/36* (2006.01)
*H01M 2/06* (2006.01)
*H01M 6/30* (2006.01)

(52) U.S. Cl.
CPC ............ *H01M 6/36* (2013.01); *H01M 2/065* (2013.01); *H01M 6/30* (2013.01)

(58) Field of Classification Search
CPC ........... H01M 6/36; H01M 2/065; H01M 6/30
See application file for complete search history.

(56) References Cited

U.S. PATENT DOCUMENTS 3,404,037 A 10/1968 McCarter
3,471,330 A * 10/1969 Berger .................. H01M 6/30
429/112

(Continued)

FOREIGN PATENT DOCUMENTS

DE 2 147 937 3/1973
EP 1 162 678 A2 12/2001

OTHER PUBLICATIONS

Cynthia A. Powell-Dagan and Arthur H. Heuer, "Microstructure of 96% Alumina Ceramics: I, Characterization of the As-sintered Materials" approved date Aug. 28, 1990.*

(Continued)

*Primary Examiner* — Emily Le
*Assistant Examiner* — Seenam Agbetiafan
(74) *Attorney, Agent, or Firm* — LSIP Law LLC

(57) ABSTRACT

At least a portion of the enclosure of a thermal battery is formed of a ceramic material that is non-porous and electrically-non-conductive. The thermal battery includes at least one cell, a squib that when activated causes the at least one cell to become active, and an enclosure that surrounds the at least one cell and the squib. Squib terminals and battery terminals extend through the enclosure and are electrically connected to the squib and to the at least one cell, respectively. At least the portion of the enclosure through which the squib and battery terminals extend is formed of the ceramic material. The enclosure includes a container and a header. At least the header is made from the ceramic material, and preferably both the container and the header are made from the ceramic material.

20 Claims, 3 Drawing Sheets

(56) References Cited

U.S. PATENT DOCUMENTS

| | | | |
|---|---|---|---|
| 3,899,353 A | 8/1975 | Tomita | |
| 6,475,662 B1* | 11/2002 | Spencer | 429/112 |
| 6,716,554 B2 | 4/2004 | Tsukamoto et al. | |
| 2003/0027038 A1* | 2/2003 | Tsukamoto | H01M 2/0426 429/122 |
| 2009/0261915 A1* | 10/2009 | Murase et al. | 331/158 |
| 2011/0020689 A1* | 1/2011 | Nam et al. | 429/120 |

OTHER PUBLICATIONS

Sep. 12, 2013 International Search Report and Written Opinion issued in International Patent Application No. PCT/US2013/044072.

\* cited by examiner

CERAMIC ENCLOSED THERMAL BATTERY

This nonprovisional application claims the benefit of U.S. Provisional Application No. 61/655,150, filed Jun. 4, 2012.

BACKGROUND

This invention relates to thermal batteries, and in particular to the enclosure (container and header (or lid)) for thermal batteries.

Thermal batteries are a type of reserve battery having a long shelf life. Such batteries are ideal for uses where the battery will be stored for long periods of time (possibly many years) and then called upon to provide power in a highly reliable fashion. Thermal batteries have been used for years in many military applications, for example, to power the guidance systems on missiles.

Thermal batteries also can be used as a backup power source for emergency situations. For example, thermal batteries can be used as a backup power source in deep-sea applications to ensure that equipment located in remote locations such as at the ocean floor for a deep water oil drilling rig have a reliable power supply in the event of a loss of power from a primary power supply. For example, thermal batteries can be used as a backup power source for a blowout preventer that is provided on oil drilling equipment.

The typical thermal battery includes a stainless steel enclosure (container and lid (also called the header)) that encloses the components of the battery. Much care must be taken when assembling the battery to ensure that the electrical components within the enclosure do not contact the electrically-conductive stainless steel enclosure. For example, insulative material is provided around the electrical components to prevent contact with the stainless steel enclosure.

The batteries also include a number of terminals which extend through the enclosure (usually through the header) so as to make electrical contact with the battery cells and with the pyrotechnic squib that is used to activate the thermal battery. Glass seals are used to seal the terminals to the enclosure where the terminals pass through the enclosure.

SUMMARY

The glass seals that are used to seal the terminals to the enclosure where the terminals pass through the enclosure typically allow for a slow leakage of gases and moisture into the thermal battery, which can degrade the hydroscopic materials inside of the battery enclosure, thus limiting the shelf life of the battery. Such leakage is exasperated when the thermal battery is used in extreme environmental conditions such as the high pressure conditions found in deep sea applications.

According to one aspect of the invention, at least the portion of the enclosure through which the terminals pass is formed of a ceramic material. By using a ceramic material, the terminals can be bonded directly to the ceramic material and thus glass seals are not needed. Accordingly, the leakage rate of gases and moisture into the battery can be substantially reduced or eliminated compared to thermal batteries in which glass seals are used between the terminals and the stainless steel or other metal enclosure material.

According to some embodiments, at least the thermal battery header is made from a ceramic material. According to preferred embodiments, the entire thermal battery enclosure, that is, the container and the header, is made from a ceramic material.

The high strength and non-corrosive nature of the ceramic materials also lend themselves to extreme environments. In addition, because the entire enclosure of the battery is not electrically conductive, such a battery lends itself to high voltage applications, or applications where electrical isolation is a critical safety concern. Many ceramic materials, for example, $Al_2O_3$ and composites that include $Al_2O_3$, also are naturally compatible with the high internal temperatures present in thermal batteries, and thus it is less critical to provide additional thermal insulation and electrical isolation for the components of the battery.

According to some embodiments, at least the battery header, and preferably also the battery container, which collectively form the thermal battery enclosure, are made from a non-porous, electrically-non-conductive ceramic material. In addition, the battery terminals which pass through the enclosure are sealed directly to the ceramic material without any glass seals therebetween. According to preferred embodiments, the ceramic material includes $Al_2O_3$ as its main component.

Thus, according to some embodiments of the invention, a thermal battery is provided that includes at least one cell, a squib, an enclosure that surrounds the at least one cell and the squib, squib terminals and battery terminals that extend through the enclosure and are electrically connected to the squib and to the at least one cell, respectively, wherein at least a portion of the enclosure through which the squib and battery terminals extend is formed of a ceramic material that is non-porous and electrically-non-conductive. The at least one cell preferably includes a cathode, an anode, a separator and a heat source, and the squib when activated causes the heat source to generate heat. The squib terminals and the battery terminals are attached to the ceramic material without glass seals between the terminals and the ceramic material. Accordingly, gas and vapor leakage through the enclosure is greatly reduced (by orders of magnitude) compared to thermal batteries in which glass seals are used to seal the terminals to the enclosure.

According to some embodiments, the portion of the enclosure through which the squib and battery terminals extend is a header of the enclosure, the header being formed of the ceramic material. The header preferably includes a metalized portion (for example, a metal ring that has been bonded to the outer periphery of the header). The metalized portion is then welded to the container in order to form a sealed compartment within the container for holding the at least one cell and the squib.

According to preferred embodiments, both the header and the container are made from the ceramic material. An open end of the container also includes a metalized portion, for example, a metal ring bonded to the open end. The metalized portion of the container is then welded to the metalized portion of the header to form the sealed compartment.

BRIEF DESCRIPTION OF THE DRAWINGS

Various exemplary embodiments of thermal batteries will be described in detail with reference to the following drawings, in which.

DETAILED DESCRIPTION OF THE EMBODIMENTS

Figure 1:
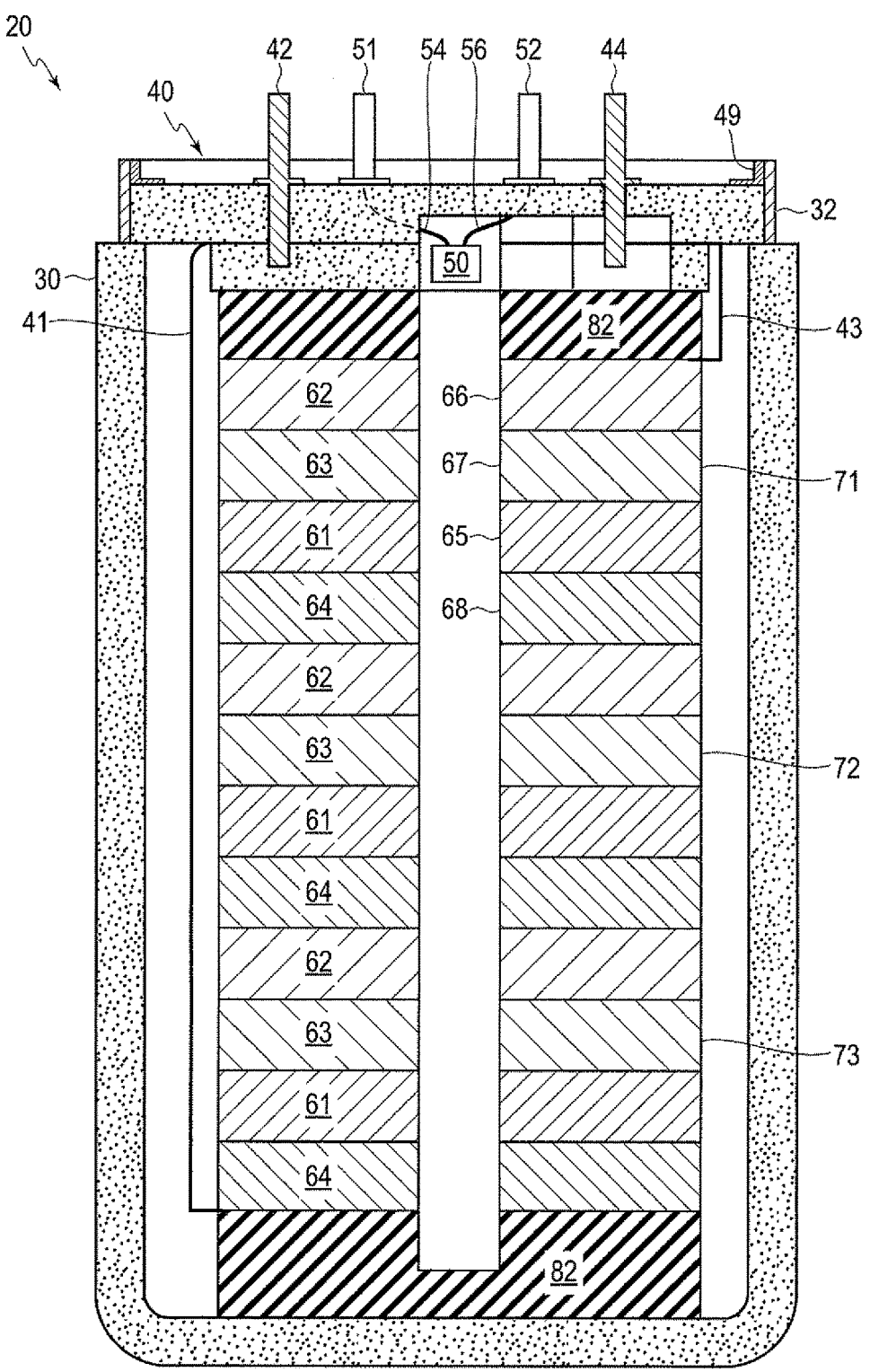
FIG. 1 is a cross-sectional view of a thermal battery according to one embodiment of the invention.

FIG. 1 is a side-section view of a thermal battery 20 according to an embodiment of the invention. The thermal battery 20 includes a plurality of cells 71, 72 and 73 arranged in a stacked relationship. Each of the cells, 71-73 includes a plurality of battery components shown as an anode 61, a cathode 62, a separator 63 and a heat source 64. Each of the anode 61, cathode 62, separator 63 and heat source 64 is provided with holes 65-68, respectively.

The plurality of cells 71-73 are enclosed in a battery enclosure which includes container 30 and header or lid 40. The battery enclosure, in particular, the header 40, includes battery terminals 42 and 44, which are attached to opposite ends of the cell stacks 71-73 by conductors 41 and 43, respectively.

The thermal battery 20 also includes a squib 50 having first and second electrical terminals 51 and 52 provided in the header 40. The first and second electrical terminals 51 and 52 are connected to the squib 50 by squib leads 54 and 56, which are partially shown in FIG. 1.

The battery also includes insulation 82 interposed between the lower end of bottom cell 73 and the floor of the container 30 and between the upper end of cell 71 and the header 40.

Upon the application of electric voltage to the squib terminals 51 and 52, the squib 50 ignites each of the heat sources 64 within the cells 71-73. The ignition of the heat sources 64 within the cells 71-73 activates the electrolyte within the separators 63 to actuate each of the cells 71-73 within the battery enclosure 30/40. Voltage produced by the cells 71-73 appears at the battery terminals 42 and 44.

Referring to FIG. 1, the enclosure, that is, the container 30 and the header 40 are made from a ceramic material that is non-porous and electrically-non-conductive. According to one embodiment, the ceramic material used to form the container 30 and the header 40 is known as AL 96. Specifications on AL 96 are set forth in the following Table 1.

TABLE 1

| AL 96 MATERIAL DATA SHEET Material Properties | | | |
|---|---|---|---|
| Density (g/cc) | 3.70 | Dielectric Constant (1 MHz) | 9.07 |
| Flexural Strength (psi) | 52885 | Dielectric Loss (1 MHz) | 0.0004 |
| Young's Modulus (psi) | 45.4E+6 | Dielectric Index (1 MHz) | 0.0036 |
| Shear Modulus (psi) | 18.6E+6 | Dielectric Constant (10.0 GHz) | 9.1 |
| Poisson's Ratio | 0.22 | Dielectric Loss (10.0 GHz) | 0.0006 |
| Thermal Expansion (/deg C.) | 6.46E−06 (@100 deg C.) 6.80E−06 (@300 deg C.) 7.54E−06 (@600 deg C.) | Volume Resistivity (Ohm-cm) | 2.5E14 (@25 deg C.) 3.2E12 (@300 deg C.) 1.0E12 (@700 deg C.) |
| Thermal Conductivity (W/m-K) | 22.7 | Permeability (atm-cc/sec) | None |

TABLE 1-continued

| AL 96 MATERIAL DATA SHEET Material Properties | | | |
|---|---|---|---|
| Dielectric Strength (V/mil) | 263 | Average Grain Size (microns) | 7.8 |
| Color | white | General Type | II |
| Chemistry (wt %) | | | |
| Al2O3 | 95.8 | | |
| SiO2 | 2.79 | | |
| CaO | 0.32 | | |
| MgO | 0.97 | | |
| Na2O | 0.04 | | |
| Fe2O3 | 0.05 | | |
| TiO2 | <0.01 | | |
| ZrO2 | <0.01 | | |
| K2O | <0.01 | | |
| BaO | <0.01 | | |
| MnO2 | 0 | | |
| Cr2O3 | 0 | | |

In the FIG. 1 embodiment, the header 40 is placed directly on the top surface of the open end of the container 30 and then sealed to the container to form a sealed compartment which holds the cells 71-73 and the squib 50. In the FIG. 1 embodiment, a metal ring 32 made, for example, from stainless steel is bonded to the top surface of the container 30 (and thus forms a part of the container) by, for example, brazing, which is a well-known process for bonding metal to ceramics. A metal ring 49 is bonded, for example, by brazing to the top of the header 40 at the periphery of the header (and thus is part of the header). Rings 32 and 49 are then welded to each other to form the sealed compartment within the enclosure defined by container 30 and header 40.

Figure 2:
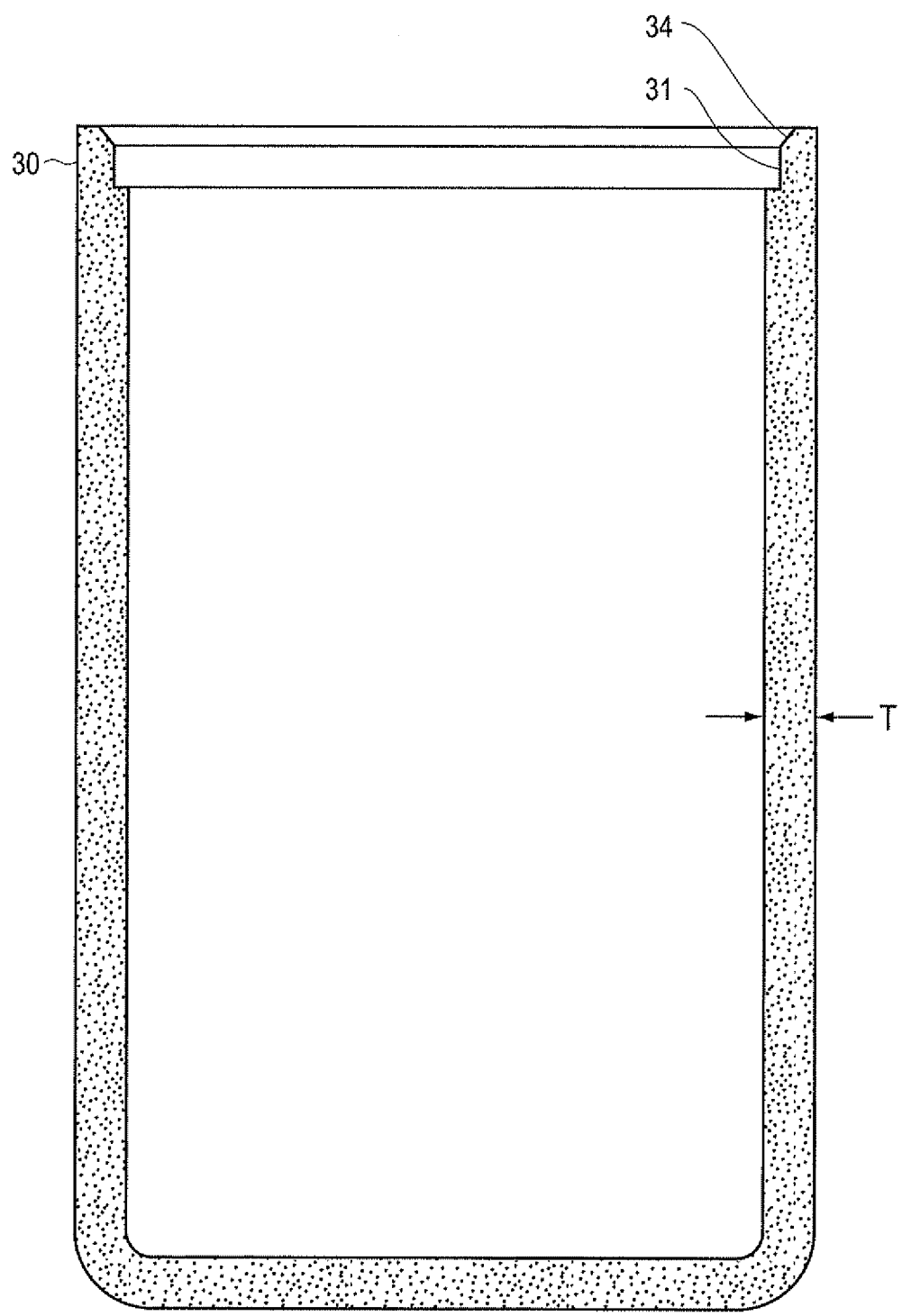
FIG. 2 is a cross-sectional view of a ceramic container of a thermal battery according to one embodiment of the invention.
Figure 3:
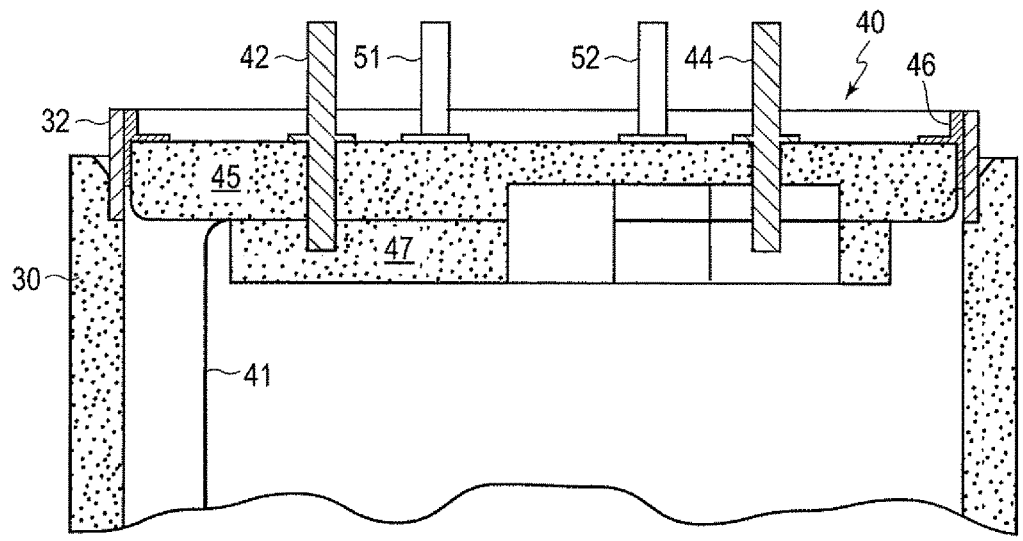
FIG. 3 is a cross-sectional view of a top portion of the FIG. 2 container and also shows the ceramic header.

FIGS. 2 and 3 show a different embodiment for attaching the header 40 to the container 30. As shown in FIG. 2, the open end of the container 30 includes a recessed portion 31 and a bevel 34. As shown in FIG. 3, the metal ring 32 is inserted into the recessed portion 31 and bonded to the container 30 by brazing as described above. The metal ring 46 that is bonded to the header 40 is slightly different in structure from the metal ring 49 shown in FIG. 1 in that a portion of the metal ring 46 extends along a peripheral side surface of the header 40. The rings 32 and 46 are attached to each other, for example, by welding to form the sealed compartment within the enclosure defined by the container 30 and the header 40. The embodiment of FIGS. 2 and 3 is advantageous compared to the embodiment of FIG. 1 in that the header 40 can slide into the container 30 (by sliding into the ring 32) so as to compress the contents (the cells) more easily. In addition, the attachment between the ring 32 and the container 30 is stronger in the embodiment of FIGS. 2 and 3 compared to the FIG. 1 embodiment.

As is apparent from FIG. 3, the header 40 is formed by two ceramic disks 45 and 47. The upper ceramic disk 45 includes holes through which the squib terminals 51 and 52 and through which the battery terminals 42 and 44 extend. The lower disk 47 includes recesses that receive ends of the terminals 42, 44, 51 and 52; however, the recesses do not extend entirely through the lower disk 47. The electrical conductors that attach the terminals 42, 44, 51, 52 to their corresponding components (either to the cells 71-73 or to the squib 50) are placed between the disks 45 and 47 and electrically connected to their corresponding terminals between the disks 45 and 47. For example, previously described conductors 41 and 43 are attached to terminals 42 and 44 between disks 45 and 47. The disks 45 and 47 are then bonded to each other to form the completed header 40. This structure of the header 40 provides for a high level of sealing between the terminals 42, 44, 51, 52 and the header 40. In particular, no glass seals are required between the terminals and the header 40. Yet, the level of sealing is orders of magnitude higher than what is achieved with glass-to-metal seals.

Figure 4:
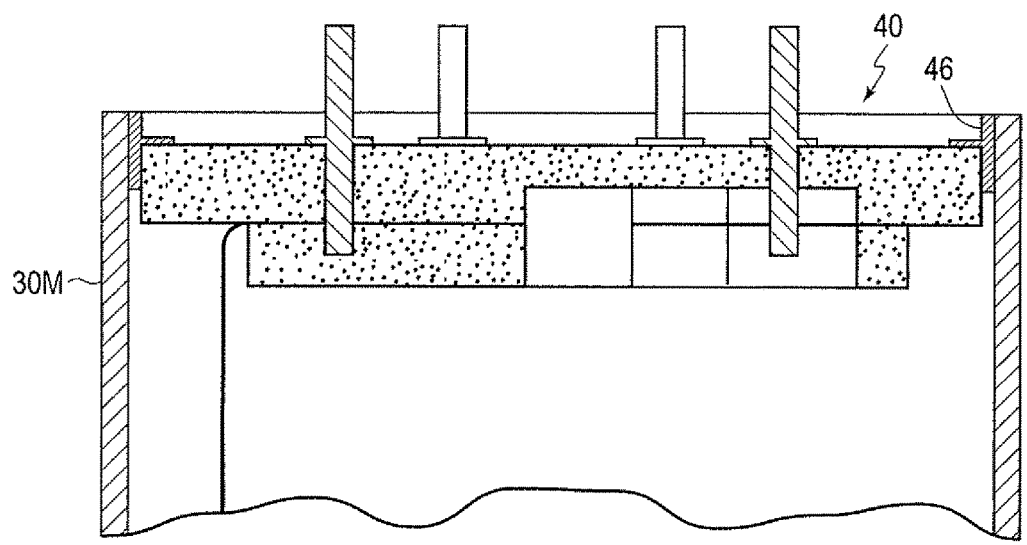
FIG. 4 is a cross-sectional view of a ceramic header used with a stainless steel container for a thermal battery.

Because the header 40 results in substantially reduced leakage, the header can be advantageously used with various containers, including containers that are not made from a ceramic material. FIG. 4 shows an embodiment in which a header 40 similar to the header shown in FIG. 3 is used with a stainless steel container 30M. The ring 46 of the header 40 is welded to the open end of the metal container 30M.

Many advantages result from using an enclosure that is made from a non-porous, electrically-non-conductive ceramic material for a thermal battery. Because the container 30 is not electrically conductive, it is unnecessary to provide insulation between the cells and the container or between the conductors (41 and 43) and the container. In high voltage environments, there is a risk of arcing between the conductors and a container that is electrically conductive. No such risk exists with a ceramic container 30. Because an insulator is not required between the ceramic container 30 and the battery components, manufacturing is made more simple and the overall battery can be made more compact.

The illustrated exemplary embodiments of a thermal battery enclosure as set forth above are intended to be illustrative and not limiting. Various changes may be made without departing from the spirit and scope of the invention.

What is claimed is:

1. A thermal battery comprising:
    at least one cell having a cathode, an anode, a separator and a heat source;
    a squib that when activated causes the heat source to generate heat;
    an enclosure including a header and a container that surrounds the at least one cell and the squib, the enclosure forms an exterior surface of the battery, wherein the surface of the container is exposed to the atmosphere, wherein the header comprises:
        an upper ceramic disk including a first set of holes and a second set of holes; and
        a lower ceramic disk bonded to the upper ceramic disk, the lower ceramic disk including a first set of recesses and a second set of recesses;
    squib terminals that extend through the first set of holes of the upper ceramic disk of the header and are electrically connected to the squib, wherein ends of the squib terminals are received in the first set of recesses of the lower ceramic disk of the header; and
    battery terminals that extend through the second set of holes of the upper ceramic disk of the header and are electrically connected to the at least one cell, wherein ends of the battery terminals are received in the second set of recesses of the lower ceramic disk of the header;
    wherein at least a portion of the header through which the squib terminals and the battery terminals extend is formed of a ceramic material that is non-porous and electrically-non-conductive and at least a portion of the container is formed of the ceramic material.

2. The thermal battery according to claim 1, wherein the squib terminals and the battery terminals are attached to the ceramic material without glass seals between the terminals and the ceramic material.

3. The thermal battery according to claim 1, further comprising a first metal ring bonded to a side of the enclosure.

4. The thermal battery according to claim 1, wherein each of the header and the container includes metalized portions that are welded together.

5. The thermal battery according to claim 1, wherein an outer periphery of the header includes a metalized portion.

6. The thermal battery according to claim 5, wherein the metalized portion of the header is welded to the container.

7. The thermal battery according to claim 1, wherein the ceramic material includes $Al_2O_3$.

8. A thermal battery comprising:
    at least one cell having a cathode, an anode, a separator and a heat source;
    a squib that when activated causes the heat source to generate heat;
    an enclosure that surrounds the at least one cell and the squib, the enclosure including a container and a header that is attached to an open end of the container to form a sealed compartment which holds the at least one cell and the squib, the enclosure forms an exterior surface of the battery, wherein the surface of the container is exposed to the atmosphere, wherein the header comprises:
        an upper ceramic disk including a first set of holes and a second set of holes; and
        a lower ceramic disk bonded to the upper ceramic disk, the lower ceramic disk including a first set of recesses and a second set of recesses;
    squib terminals that extend through the first set of holes of the upper ceramic disk of the header and are electrically connected to the squib, wherein ends of the squib terminals are received in the first set of recesses of the lower ceramic disk of the header; and
    battery terminals that extend through the second set of holes of the upper ceramic disk of the header and are electrically connected to the at least one cell, wherein ends of the battery terminals are received in the second set of recesses of the lower ceramic disk of the header;
    wherein at least a portion of each of the container and the header is formed of a ceramic material that is non-porous and electrically-non-conductive.

9. The thermal battery according to claim 8, wherein the squib terminals and the battery terminals are attached to the ceramic material of the header without glass seals between the terminals and the ceramic material.

10. The thermal battery according to claim 8, wherein an outer periphery of the header includes a metalized portion that is welded to the container to form the sealed compartment.

11. The thermal battery according to claim 8, wherein the ceramic material includes $Al_2O_3$.

12. The thermal battery according to claim 8, wherein the container is formed of the ceramic material that is non-porous and electrically-non-conductive.

13. The thermal battery according to claim 12, wherein each of the header and the container includes metalized portions that are welded together to form the sealed compartment.

14. The thermal battery according to claim 12, wherein the ceramic material includes $Al_2O_3$.

15. The thermal battery according to claim 8, further comprising a first metal ring bonded to a side of the enclosure.

16. The thermal battery according to claim 15, further comprising a second metal ring bonded to a top of the enclosure at a periphery of the enclosure, wherein the first metal ring and the second metal ring are welded to each other to form a sealed enclosure.

17. The thermal battery according to claim 8, further comprising a first metal ring bonded to a top surface of the container.

18. The thermal battery according to claim 17, further comprising a second metal ring bonded to a top of the header at a periphery of the header, wherein the first metal ring and the second metal ring are welded to each other to form the sealed compartment.

19. The thermal battery according to claim 8, wherein the ceramic material includes $Al_2O_3$, $SiO_2$, CaO, MgO, $Na_2O$, $Fe_2O_3$, $TiO_2$, $ZrO_2$, $K_2O$, and BaO.

20. The thermal battery according to claim 19, wherein the percent weight of the ceramic material is $Al_2O_3$ 95.8%,
$SiO_2$ 2.79%,
CaO 0.32%,
MgO 0.97%,
$Na_2O$ 0.04%,
$Fe_2O_3$ 0.05%,
$TiO_2$<0.01%,
$ZrO_2$<0.01%,
$K_2O$<0.01%, and
BaO<0.01%.

* * * * *